F. F. FORSHEE.
ELECTRIC WAFFLE IRON.
APPLICATION FILED JAN. 30, 1920.

1,401,688.

Patented Dec. 27, 1921.

WITNESSES:
H. T. Shelhamer
N. M. Biebel

INVENTOR
Frank F. Forshee
BY
Wesley G. Carr
ATTORNEY

UNITED STATES PATENT OFFICE.

FRANK F. FORSHEE, OF FLINT, MICHIGAN, ASSIGNOR TO WESTINGHOUSE ELECTRIC PRODUCTS COMPANY, A CORPORATION OF MICHIGAN.

ELECTRIC WAFFLE-IRON.

1,401,688.　　　　　Specification of Letters Patent.　　Patented Dec. 27, 1921.

Application filed January 30, 1920. Serial No. 355,073.

*To all whom it may concern:*

Be it known that I, FRANK F. FORSHEE, a citizen of the United States, and a resident of Flint, in the county of Genesee and State of Michigan, have invented a new and useful Improvement in Electric Waffle-Irons, of which the following is a specification.

My invention relates to electrically-heated apparatus and particularly to electrically-heated waffle-irons and it has for its object to provide neat and simple means for carrying a waffle-iron and for turning one of its members from a parallel to a substantially right-angle relation to the other and vice versa. Another object is to provide simple and inconspicuous means for electrically connecting the heating elements located in the two casings.

In waffle-irons now manufactured, no provision is made for carrying the same, and the upper casing is usually provided with a small handle to be utilized in turning it between its closed and its open position. Contact terminals are provided in each casing, and contact sockets, electrically connected to the supply circuit, coöperate with the terminals to energize the heating elements located in the casings.

More specifically, my invention embodies two hinge-connected casings, each casing containing a waffle-baking plate, a heating element adjacent thereto and a layer of heat-insulating material between the heating element and the cover-portion of the casing. A socket member is provided on the hinge side of each casing, and the ends of a flexible conduit are located in the socket members, the conductors connecting the two heating elements being located in such conduit. A terminal device is mounted on the bottom of the lower casing and is suitably connected to the electrical heating elements.

A handle member of substantially U-shape is pivotally mounted on the lower casing and is so connected, by means of link members, to the upper casing, that the pivotal movement of the handle member on the lower casing determines the position of the upper casing relative to the lower casing. When the handle member is in such position that the two casings are in their normal operative positions, it may be used to carry the waffle-iron. When the handle member is moved downwardly on its pivotal mounting on the lower casing, it moves, by means of the link members, the upper casing, on its hinges, away from the lower casing, until, when the handle member is moved to its lowest position, the upper casing is substantially at right angles to the lower casing.

Figure 1:
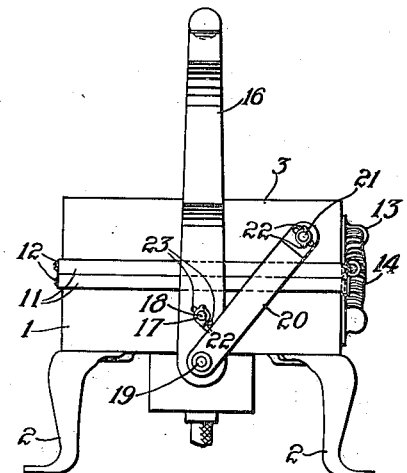
Figure 2:
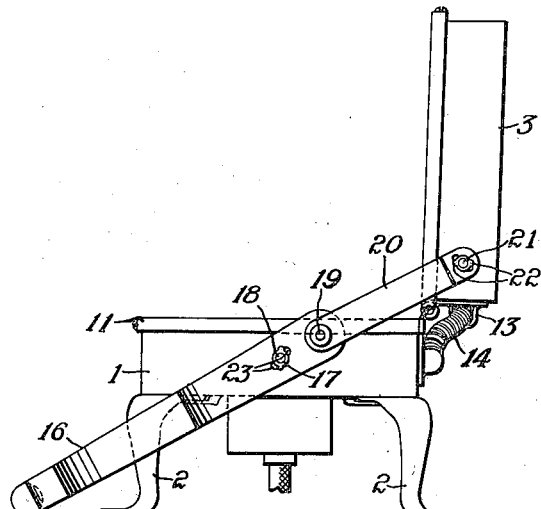
Figure 3:
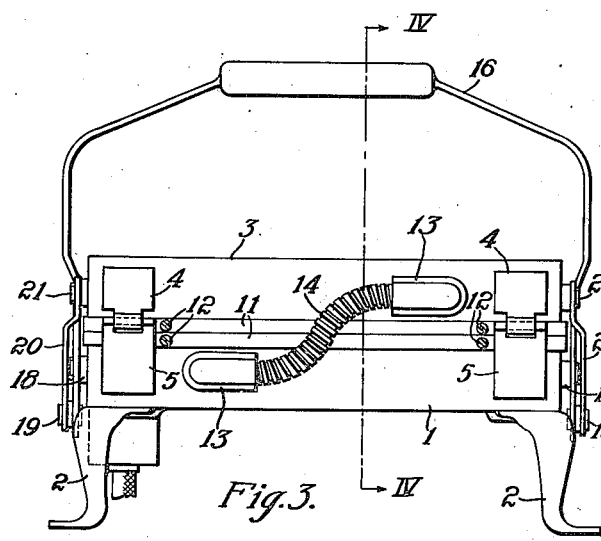
Figure 4:
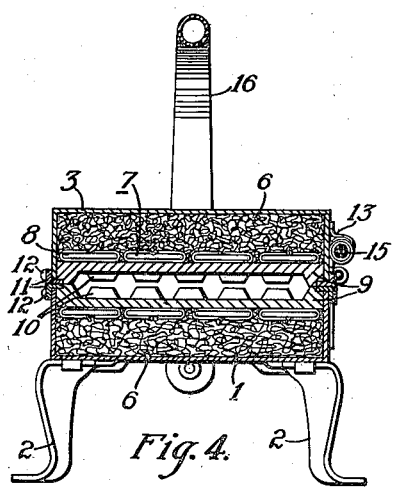

In the accompanying single sheet of drawings, Figure 1 is a view, in side elevation, of a device embodying my invention, with the two coöperating members in their normal operative positions; Fig. 2 is a view, in side elevation, of the device, with the upper member in its open position, showing the relative position of the handle and link members; Fig. 3 is a rear view, in elevation, of a device embodying my invention, and Fig. 4 is a view, in cross-section, along the line IV—IV of Fig. 3.

A lower casing 1 is supported by a plurality of supporting legs 2, suitably secured thereto. An upper casing 3 is movably connected to the casing 1 by means of a plurality of coöperating hinge members 4 and 5 which are suitably secured to the casings 1 and 3. The two casings 1 and 3 are here shown as rectangular in outline but they may be of any desired outline.

At the bottom of the casing 1 and at the top of the casing 3, are located layers of heat-insulating material 6, such as mineral wool, and, adjacent to this layer, is a suitable heating element 7, here shown as a plurality of flat resistors 8. As these heating elements may be of any suitable form, they will not be further described in detail. Adjacent to the heating element 7 in each casing, is a waffle plate 9 which may be made of aluminum and which has a plurality of projections 10 such as ordinarily pertain to waffle-irons. The plate 9 fits within the casing and is retained in its operative position by means of a strip member 11, substantially L-shape in cross-section which engages a perimetral shoulder on the plate 9 and which may be suitably secured to the body portion of the casing by a plurality of screws 12. The angle strip 11, which is employed to retain the waffle plate 9 securely in its operative position, may be of the same material as the body portion of the casing and be given the same finish but is made detachable in order that the parts located in the casing may be assembled and be readily inspected and also repaired and replaced, when desired. When the two casings and the parts associated therewith are in the positions shown in Figs. 1, 3 and 4, the faces of the two members 11 are in abutting engagement, while the projections 10 of the two members 9 are of such length as to leave small clearances between the opposing projections.

The hinge sides of the casing members 1 and 3 are provided with socket members 13 which receive the ends of an armored flexible conduit 14. Two conductors 15 are located in the conduit 14 and project through openings in the casings to connect the two heating elements 7, 7, the openings being concealed by the socket members 13.

A handle member 16, of substantially U-shape, is pivotally mounted on the casing 1. A circular opening 17 is provided in each leg of the member 16, near the lower end thereof, which opening engages the reduced outer end of a circular pin or stud 18 mounted on the casing 1. At the outer end of each leg of the handle member 16 is located a pin 19 on which is pivotally mounted one end of a link member 20, while the other end of the link member is pivotally mounted on a stud 21 which is located near the hinge side of the casing 3. Each of the pins 18 and 21 is provided with relatively small alined projections 22 near their outer ends which serve to retain the handle member 16 and the link member 20 on their respective studs. The opening 17 in the handle member 16 is provided with two small alined additional openings 23 which are similar, in dimensions and in outlines, to the projections 22 on the stud 18. To mount the handle member 16 on the studs 18, the handle member is held in substantially the position shown in Fig. 2 except that the upper part thereof is so depressed that the openings 23 will register with the projections 22. For all other positions of the handle member 16 on the studs 18, the projections 22 operate as a means to retain the handle member on the studs.

The location of the studs 21 on the casing 3, the length of the link members 20, and the length of the lever arm of the handle member 16 below the studs 18, are so selected that the upper casing 3 is in the position shown in Fig. 1 when the handle member is in its vertical position. In this position, the handle member may be utilized to carry the complete waffle-iron. To open the waffle-iron to the position shown in Fig. 2, the handle member 16 is moved in a counter-clockwise direction from the position shown in Fig. 1. This action moves the pins 19 and the associated ends of the links 20 in a counter-clockwise direction and operates to rotate the casing 3 on its hinges, in a clockwise direction, until, when the top of the handle member is substantially in contact with the surface upon which the waffle iron rests, the casing 3 is in the position shown in Fig. 2. The pin 19 is just above the line connecting the centers of pins 18 and 21 so that the casing 3 is locked in its open position and may be moved to its closed position only by means of the handle member 16.

It may be noted that the device embodying my invention provides a combined carrying and casing-operating member and also provides neat and inconspicuous conducting means for conducting the current from one casing to the other, irrespective of their relative angular positions.

While I have shown a specific form of the device embodying my invention, various changes may be made therein without departing from the spirit and scope thereof, and I desire that only such limitations shall be placed thereon as are imposed by the prior art or are specifically set forth in the appended claims.

I claim as my invention:

1. In an electrically-heated apparatus, the combination with a lower casing and an upper casing pivotally mounted on the lower casing, of a handle member directly mounted on the lower casing for carrying both casings, and means responsive to movements of the handle member for moving the upper casing relatively to the lower casing.

2. In an electrically-heated apparatus, the combination with a lower casing and an upper casing, pivotally mounted on the lower casing, of a bail mounted on the lower casing for carrying both said casings, said bail being held in a substantially vertical position by the upper casing when the latter is in its closed position relatively to the lower casing.

3. In an electrically-heated apparatus, the combination with two superposed hinged casings, of a bail mounted directly on the lower casing for carrying both said casings and means coöperating with said bail for maintaining the upper casing in predetermined angular relation to the lower casing.

4. In an electrically-heated apparatus, the combination with an upper and a lower casing hinged together, of a bail pivotally mounted on the lower casing for carrying both of said casings and means coöperating with said bail for maintaining the upper casing in predetermined angular relation to the lower casing.

5. In an electrically-heated apparatus, the combination with a lower casing and an upper casing having a closed and an open position relative to the lower casing, of means mounted directly on the lower casing for carrying both of said casings and for maintaining the upper casing in its open position relative to the lower casing.

6. In an electrically-heated apparatus, the combination with two casings having open and closed positions relative to each other, of means directly mounted on one of said casings for carrying both said casings and for locking one of said casings in its open position relative to the other of said casings.

7. In an electrically-heated apparatus, the combination with a casing, and a second casing having a pivotal connection to the first casing, of a handle member pivotally and directly mounted on said first casing for carrying both said casings, and a link member pivotally connected to said handle member and to said second casing for varying the angular relation of said casings to each other.

8. In an electrically-heated apparatus, the combination with a lower casing, and an upper casing pivotally mounted on the lower casing, of a handle member directly mounted on said lower casing for carrying both casings, and a link member pivotally connected to said handle member and to said upper casing for varying the angular position of the upper casing with regard to the lower casing, in accordance with the position of the handle member.

9. In an electrically-heated apparatus, the combination with an upper and a lower casing, of carrying means for said casings pivotally and directly mounted on the lower casing and means operatively associated with said carrying means for varying the relative angular position of said casings in accordance with the angular position of said carrying means on said lower casing.

10. In an electrically-heated apparatus, the combination with an upper and a lower casing, of carrying means for said casings pivotally mounted on the lower casing and having a plurality of angular positions relative thereto, and means operatively connected to said carrying means for maintaining the upper casing in one position relative to the lower casing when the carrying means is in one of its positions and for locking the upper casing in another position relative to the lower casing when the carrying means is in another of its positions.

11. In an electrically-heated apparatus, the combination with a casing, a baking surface associated with said casing, an electric heating element contained in said casing, a second casing, a baking surface associated with said second casing, an electric heating element contained in said second casing and hinges connecting said casings mounted at one side thereof, of current-conducting means connecting said heating elements and mounted on said casings at their hinged sides, and means pivotally mounted on one of said casings for carrying said casings and for varying the angular position of said casings with regard to each other.

12. In an electrically-heated apparatus, the combination with two superposed casings, an electrical heating element in each of said casings and a plurality of hinges mounted on one side of said casings, of a socket member mounted on each of said casings at its hinge side, a flexible conduit having its ends terminating in said socket members, and current-conducting means located in said conduit and connecting said electrical heating elements.

13. In an electrically-heated apparatus, the combination with two superposed casings, a plurality of hinges pivotally connecting said casings and mounted at one side thereof, and an electrical heating element in each of said casings, of a socket member mounted on each of said casings at its hinge side, a flexible conduit having its ends terminating in said socket members, current-conducting means located in said conduit and connecting said electrical heating elements, a handle member pivotally mounted on one of said casings, and link members pivotally associated with said handle member and with said upper casing for varying the relative angular position of the two casings in accordance with the position of the handle member.

14. An electrically-heated apparatus comprising two coöperating, hinged open casings, each having located therein a layer of heat-insulating material, a heating element, and a baking surface, said baking surfaces being located at the open sides of the respective casings, each of said casings having means for retaining the respective baking surfaces in their operative positions, and means pivotally mounted on one of said casings for carrying said casings and for maintaining said casings in predetermined angular relation to each other.

15. In an electrically-heated apparatus, the combination with an upper and a lower casing hinged together and a pin on each of said casings, of a handle member pivotally mounted on the pin on said lower casing and adapted to carry said casing, a link member pivotally connected to said handle member and to the pin on said upper casing for varying the angular position of the two casings with regard to each other in accordance with the position of the handle member, and means on each of said pins for retaining the handle member and the link member in operative engagement with the respective pins on said casings.

16. In an electrically-heated apparatus, the combination with an upper and a lower casing hinged together, of a plurality of pins on the lower casing, a handle member of substantially U-shape pivotally mounted on said pins and means on said pins for retaining the handle member thereon, and for permitting the removal of the handle member therefrom in a predetermined angular position of the handle member relative to said casing.

17. In an electrically-heated apparatus, the combination with a casing and a plurality of pins on said casing, of carrying means for said casing mounted on said pins and having a plurality of positions relative to said casing, and means on said pins for permitting the removal of said carrying means in only one of said positions.

18. In an electrically-heated apparatus, the combination with an open casing, heat-insulating means in said casing, a baking plate located at the open side of said casing and having a perimetral shoulder, and an electrical heating element located between said heat-insulating means and said baking surface, of means comprising a member of substantially L-section secured to said casing and engaging said shoulder for retaining said baking plate in its operative position in said casing.

19. In an electrically-heated apparatus, the combination with an upper and a lower casing hinged together, of a plurality of pins on the lower casing, a handle member of substantially U-shape adapted to be pivotally mounted on said pins, and means on said pins permitting the mounting of said handle member on said pins and its removal therefrom, in a predetermined position only.

20. In an electrically-heated apparatus, the combination with a lower heating element and an upper heating element having angular movement relatively to the lower heating element, of movable means directly mounted on the lower element for moving the upper element and for holding it in fixed relation to the lower element.

21. In an electrically heated apparatus, the combination with a lower heating element and an upper heating element having angular movement relatively to the lower heating element, of movable means directly mounted on the lower element for angularly moving the upper element and for limiting said angular movement to a predetermined value.

In testimony whereof, I have hereunto subscribed my name this 26 day of Jan. 1920.

FRANK F. FORSHEE.